United States Patent

Czerwinski

[11] Patent Number: 6,058,028
[45] Date of Patent: May 2, 2000

[54] CONTROL OF A DC MATRIX CONVERTER

[75] Inventor: Christopher S. Czerwinski, Middletown, Conn.

[73] Assignee: Otis Elevator Company, Farmington, Conn.

[21] Appl. No.: 09/310,393

[22] Filed: May 12, 1999

[51] Int. Cl.[7] .................................................. H02M 1/12
[52] U.S. Cl. .............................. 363/44; 318/811; 363/39
[58] Field of Search ......................... 363/39, 44; 318/811

[56] References Cited

U.S. PATENT DOCUMENTS 5,541,827   7/1996   Allfather .................................... 363/17

OTHER PUBLICATIONS

D.G. Holmes, T. A. Lipo: Implementation of a Controlled Rectifier Using AC–AC Matrix Converter Theory, IEEE Transactions on Power Electronics, vol. 7, No. 1, Jan. 1992, pp. 240–250.

D. Casadei, G. Grandi. G. Serra, A. Tani: Space Vector Control of Matrix Converters With Unity Input Power Factor and Sinusoidal Input/Output Waveforms, EPE '93, Brighton, Sep. 13–16, 1993, pp. 170–175.

L. Huber, D. Borojevic: Space Vector Modulated Three–Phase to Three–Phase Matrix Converter with Input Power Factor Correction, IEEE Transactions on Industry Applications, vol. 31, No. 6, Nov./Dec. 1995, pp. 1234–1246.

*Primary Examiner*—Shawn Riley

[57] ABSTRACT

A DC matrix converter having six forward current conducting power switches and six reverse current conducting power switches has the on time duration of each power switch within a pulse width modulation period controlled by relationships between d and q components of a modulation index determined by the ratio of a voltage command to the instantaneous voltage of the AC mains expressed in stationary dq coordinates, the selection of which is made based on inequalities between the DC main voltage components expressed in stationary dq coordinates. Switch selection is also performed in response to relationships of the AC main voltage components expressed in stationary dq coordinates. Zero vectors are selected to minimize the common mode voltage.

9 Claims, 10 Drawing Sheets

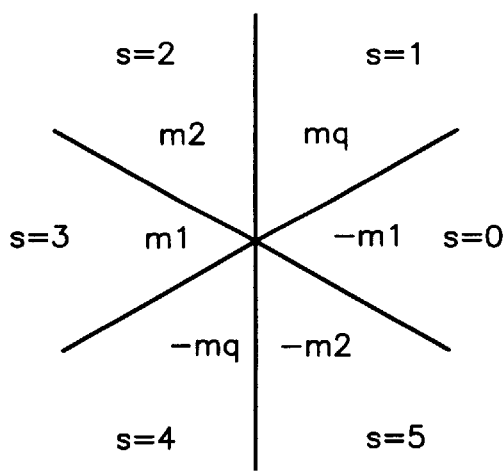
FIG.5 dα
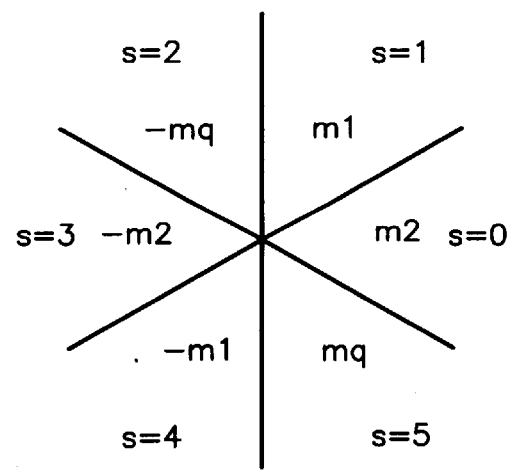
FIG.6 dβ
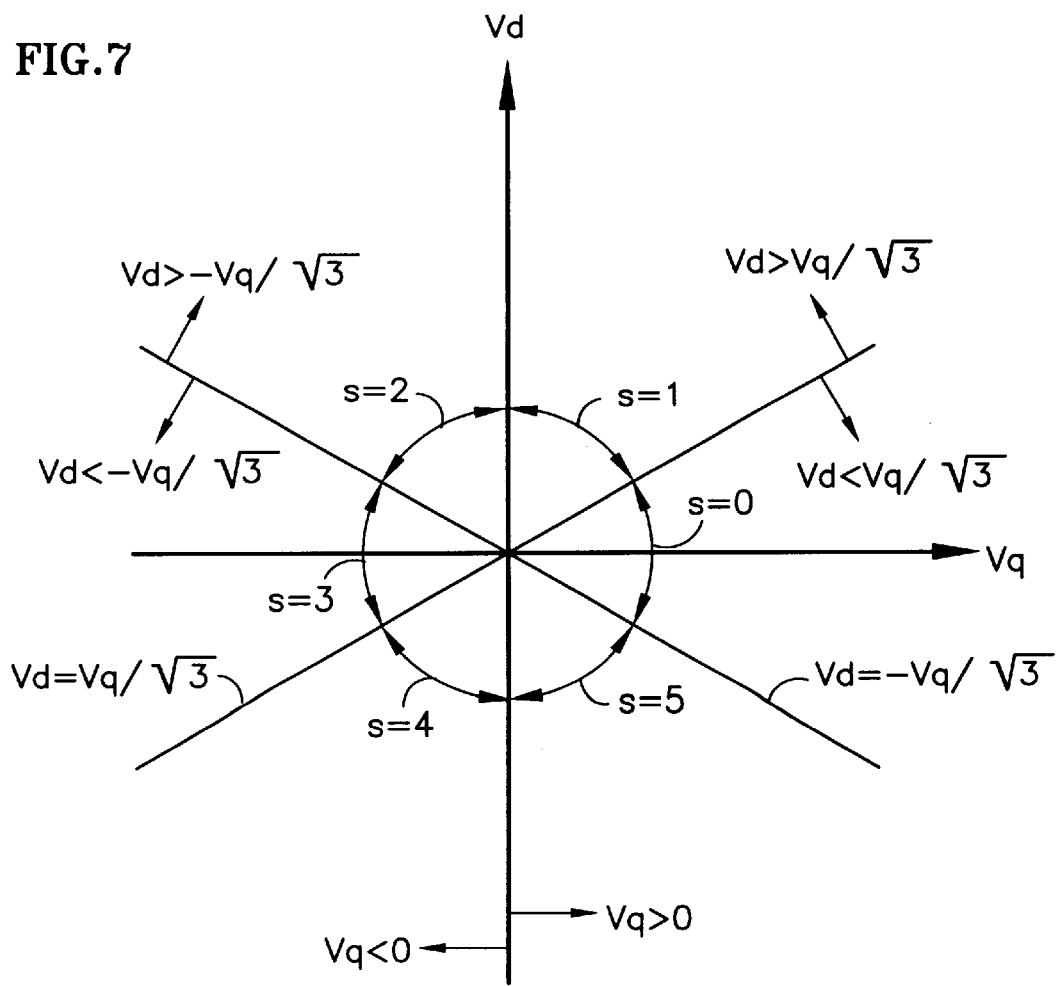
FIG.7

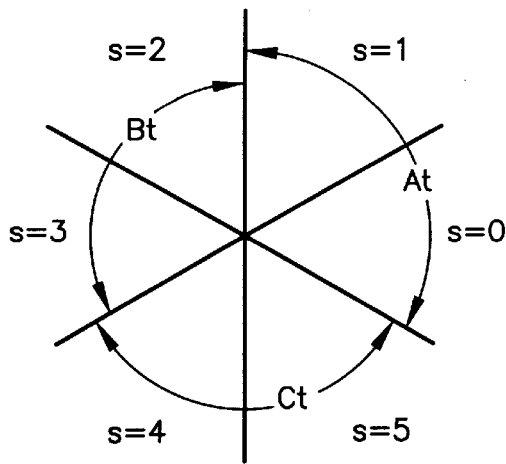
FIG.9  TOP α SWCH
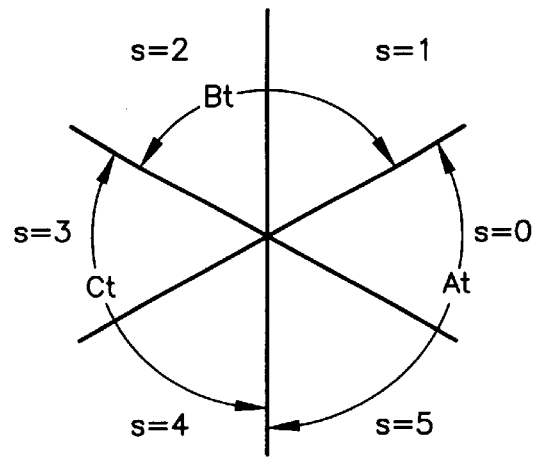
FIG.10  TOP β SWCH
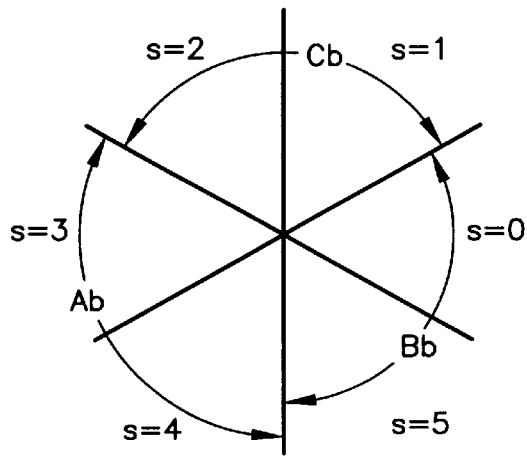
FIG.11  BOTM α SWCH
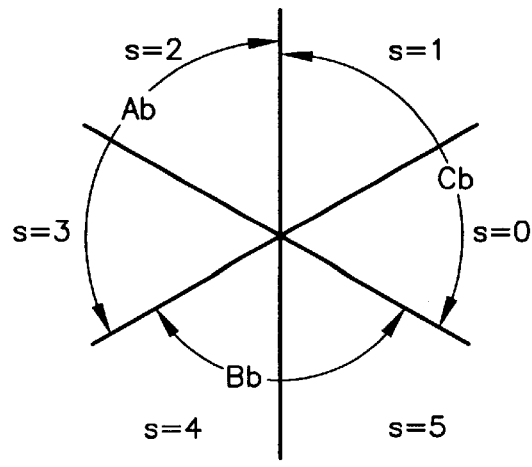
FIG.12  BOTM β SWCH

6,058,028

CONTROL OF A DC MATRIX CONVERTER

TECHNICAL FIELD

This invention relates to controlling a direct, AC to DC matrix converter to supply controlled DC voltage to a load utilizing precisely controlled, pulse width modulation.

BACKGROUND ART

In commonly owned, copending U.S. patent application Ser. No. 09/310,600 filed contemporaneously herewith, a direct, 3-phase AC to DC matrix converter employs switches which are controlled in sequence to directly synthesize a desired average DC voltage waveform at the input terminals of the DC motor, while simultaneously distributing the DC output current among the AC input lines as a sinusoidal waveform in phase with the AC voltage. The difference between the direct DC matrix converter of said copending application and prior DC-PWM converters is that the prior converters create a DC power of a fixed voltage, much the same as a battery, and then utilized some portion of the voltage, as needed, synthesizing a correct DC voltage, on average, by means of pulse width modulation, whereas in said application, the desired voltage at the desired current is synthesized by pulse width modulation directly from the AC mains, while retaining the sinusoidal balance and unity power factor of the AC input currents.

In the system of said application, each switch is turned on and off in each modulation period. As is known, the switching losses in power switches occur only during transition between the non-conducting and conducting states; therefore, reducing the number of commutations will significantly reduce power losses in the switches.

DISCLOSURE OF INVENTION

Objects of the invention include providing pulse width modulation synthesis of DC voltage directly from three-phase AC mains with minimal commutation losses, with a minimum of calculations (processor steps), with modulation frequencies as high as 10 KHz or more to provide minimal ripple in the DC voltage and current, with minimal distortion and a unity power factor at the AC mains.

This invention is predicated on my discovery that all switches in a DC matrix converter can be turned on and remain on for two out of three portions of the same or adjacent pulse width modulation periods, when operated in a proper sequence, including two voltage producing portions and one non-voltage producing portion of each pulse width modulation period.

According to this invention, the switch-on time of DC matrix power switches is determined by the ratio of an instantaneous voltage command signal, V*, (indicative of the voltage to be provided by said DC matrix converter) to the instantaneous magnitude, V, of the three-phase AC mains in stationary dq coordinates, along with the phase relationship between the present instantaneous phase of said AC mains voltage in stationary dq coordinates and the leading and lagging boundaries of six phase sectors that span a cycle of said AC mains.

According to the invention further, the phase relationship are expressed in terms of dq quantities, using trigonometric angle-sum relationships and identified by inequalities existing between the voltages of the AC mains expressed in orthogonal dq coordinates and zero.

In still further accord with the invention, the pairs of switches to be used in each portion of a pulse width modulation period are selected by relationships between the components of the AC mains voltage in orthogonal DQ coordinates. The invention may be implemented in DC matrix converters which supply unilateral current, bilateral current, and with or without regeneration.

Other objects, features and advantages of the present invention will become more apparent in the light of the following detailed description of exemplary embodiments thereof, as illustrated in the accompanying drawing.

BRIEF DESCRIPTION OF THE DRAWINGS

FIGS. 5 and 6 are diagrams illustrating various parameters of the invention in various sectors of a cycle.

FIG. 7 is a space-vector diagram illustrating inequalities used to control a DC matrix in accordance with the present invention.

FIGS. 9–12 are diagrams illustrating sectors of a cycle in which various switches may be operated.

BEST MODE FOR CARRYING OUT THE INVENTION

Figure 1:
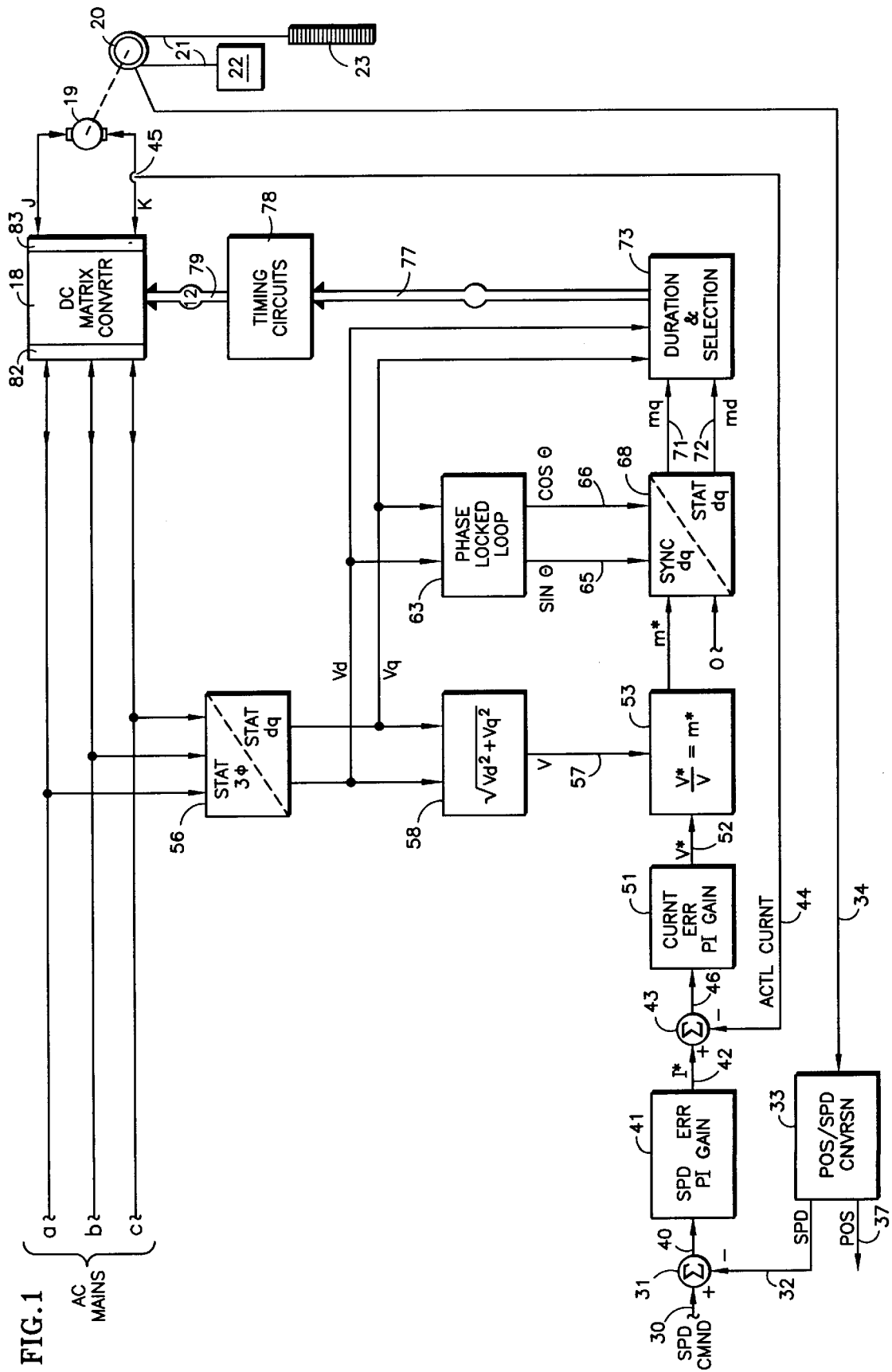
FIG. 1 is a schematic block diagram of an elevator system employing a DC matrix converter controlled in accordance with the present invention.

Referring to FIG. 1, a DC matrix converter 18 provides current to a DC motor 19, which in this embodiment is shown mechanically connected to a sheave 20 which is connected by roping 21 to an elevator car 22 and a counterbalance 23. The DC matrix converter 18 selectively connects various pairs of the three-phase AC mains a, b, c directly to the output terminals of the converter j, k. The voltage can be positive at terminal j and negative at terminal k, and conventional positive current flowing from terminal j to terminal k, such as, for instance, when the elevator is being driven upwardly with a heavy load, or terminal k can be positive, terminal j negative and conventional positive current flowing from k to j, such as, for instance, when the elevator is being driven downwardly with a light load; this is called "motoring". Whenever the elevator is traveling upwardly with a light load, downwardly with a heavy load, or is decelerating, the sheave 20 will actually drive the motor 19 so that the motor 19 acts as a generator. In such a case, the positive current flow through the motor 19 will be of opposite polarity from the polarity of voltage at the terminals j, k; this is called "regeneration". The DC matrix converter 18 will connect the switches appropriately in dependence upon magnitude and direction of a speed command provided to the DC matrix converter controller of FIG. 1, and whether the motor 19 is operating in a motoring mode or in a regeneration mode.

In the example herein, the commands which will ultimately cause the DC matrix converter to drive the motor 19 in a desired fashion are provided by a conventional elevator motion controller (not shown) which provides a speed command on a line 30 to a summer 31 which subtracts the actual speed on the line 32 provided by a conventional position and speed conversion circuit 33 in response to a signal on a line 34 from a suitable, conventional encoder (not shown) which is coupled to the sheave 20 (or the motor 19, as the case may be). A position output of the circuit 33 on a line 37 is fed back to the motion controller so as to determine the continuity of commands necessary to cause the elevator to move in the desired fashion, all as is well known in the art and forms no part of the present invention. The output of the summer 31 is provided on a signal line 40 to a conventional speed error proportional and integral gain circuit 41, the output of which on a line 42 comprises a current command, I*, which is fed to a summer 43. The summer 43 subtracts the actual motor current on a line 44, derived from a conventional current sensor 45 to provide a current error signal on a line 46. The current error signal is processed with conventional proportional and integral gain in a circuit 51, the output of which on a line 52 comprises a voltage command, V*.

In accordance with the invention, the ratio of the magnitude of the voltage command to the magnitude of the input AC mains voltage vector, in stationary dq coordinates, determines a modulation index, m*, which is used to determine the duration of switch-on time during pulse width modulation of the voltage on the AC input mains in order to achieve the desired DC voltage for application to the load, such as the motor 19.

The voltage on the AC mains a, b, c is fed to a conventional stationary three-phase to stationary dq coordinate conversion circuit 56 to provide outputs Vd, Vq which define the three-phase input voltages of the AC mains in orthogonal coordinates, as is known. The magnitude of the AC mains, V, on a line 57, is simply the square root of the sum of the squares of Vd, Vq, performed in a conventional unit 58. The orthogonal magnitudes Vd, Vq are also fed to a conventional phase locked loop 63, the output of which on lines 65 and 66 are signals indicative of sine Θ and cosine Θ, respectively. These are applied to a circuit 68 which converts the modulation index m* in synchronous dq coordinates to desired modulation index components mq, md in stationary dq coordinates. The mq and md signals on lines 71, 72 are fed to a duration and selection function 73 which determines the duration for which a selected pair or set of switches should be turned on, and selects which pair or set of switches are to be on, at any given moment, to perform the necessary pulse width modulation in order to synthesize the desired DC voltage at the output terminals, j, k, of the DC matrix converter 18. The functions 73 are described more fully hereinafter. Signals indicative of the duration of switch on times, and the selected pair of switches to be turned on, are provided over a trunk of lines 77 to timing circuits 78 which actually count pulses in real time so as to implement the desired durations by providing switch on gating circuits over a trunk of 12 lines 79 to the DC matrix converter 18. The timing circuits turn the switches on and off according to conventional commutation methods, so that each of the output terminals is always connected to an AC main, with no open circuit gaps, to satisfy the known continuity of current constraint. One commutation example is set forth in Holmes and Lipo, "Implementation of a Controlled Rectifier Using AC—AC Matrix Converter Theory", IEEE Trans. Power Elec., January, 1992.

Although not shown in FIG. 1, the DC matrix converter of the invention requires line-to-line capacitance across the AC input to support switch commutation described hereinafter. These may be included along with in-line inductors within an input filter 82. Similarly, the DC matrix converter preferably has an output filter 83 with series inductance and shunt capacitance, both filters being shown in the aforementioned application.

Figure 2:
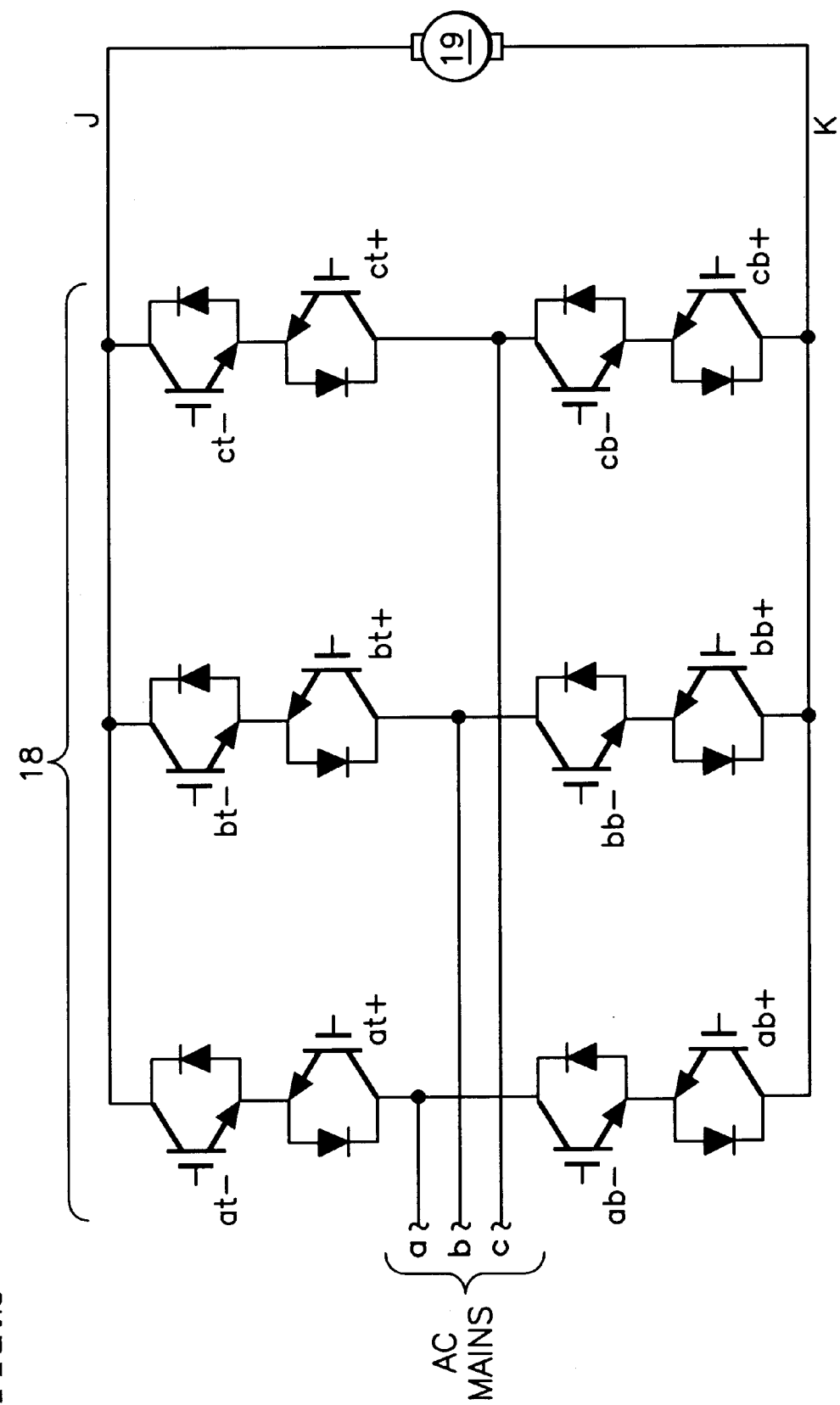
FIG. 2 is a schematic diagram of a common emitter, DC matrix converter which may be controlled in accordance with the present invention.

One embodiment of a DC matrix converter 18 is illustrated in FIG. 2. For each phase of the AC mains, a, b, c there are two power transistor switches at the top of FIG. 2 and two switches at the bottom of FIG. 2. One switch at the top of FIG. 2, at+, bt+, ct+ will conduct current from the corresponding one of the AC mains through the terminal j to the motor 19 while one of the corresponding bottom switches ab+, bb+ cb+ will conduct current from the motor 19, through the terminal k to the corresponding one of the AC mains. For purposes of illustration herein, flow of current from the terminal j, downwardly through the motor 19 to the terminal k is deemed to be positive current flow. For negative current flow, one of the negative bottom switches ab–, bb–, cb– will conduct current from the corresponding one of the AC mains, through the terminal k, through the motor 19, to the terminal j, and one of the top negative switches at–, bt–, ct– will conduct current from the terminal j to a corresponding one of the AC mains.

Figure 3:
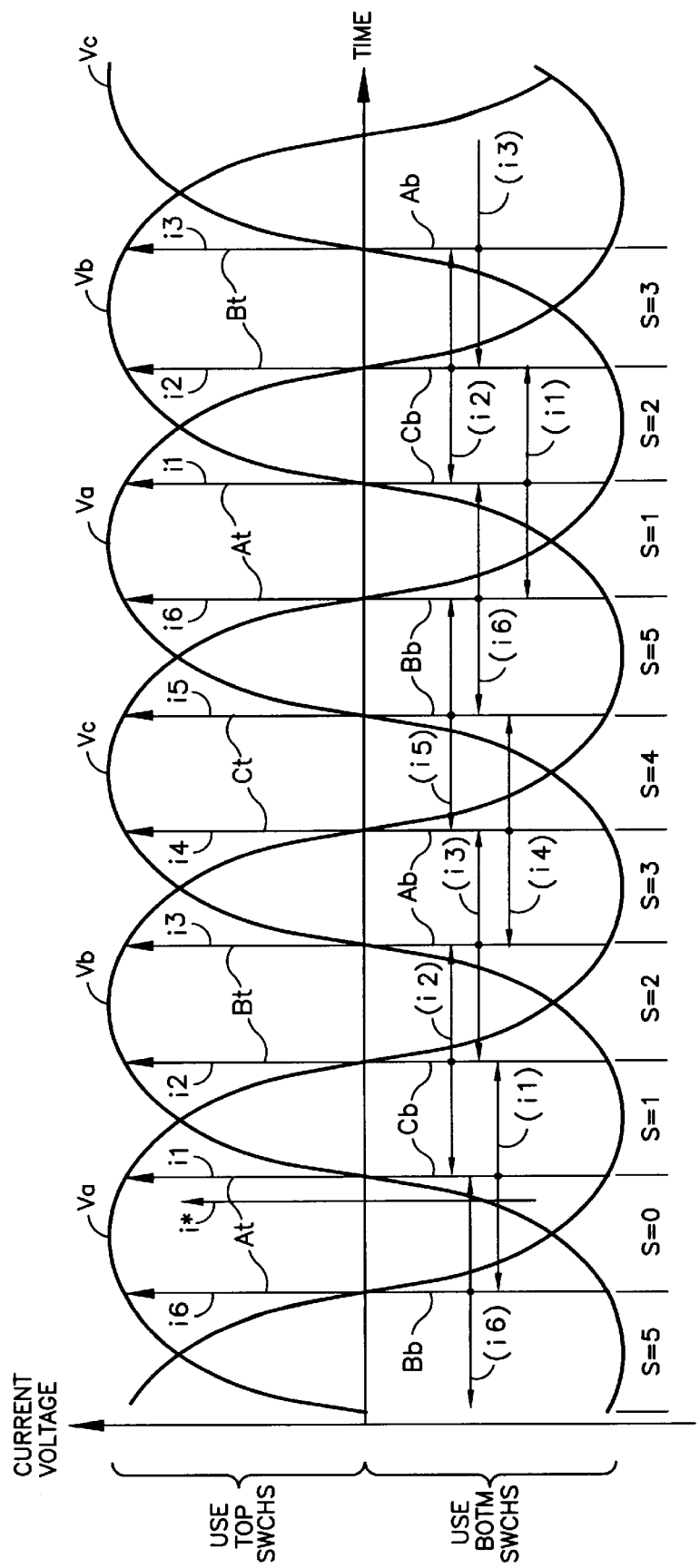
FIG. 3 is a plot of AC mains voltage including designations of current vectors related to the present invention.

The general nature of operation of the DC matrix converter is illustrated in FIG. 3. Therein, the sinusoidal voltage of the AC mains Va, Vb, Vc is plotted against time. Also plotted in FIG. 3 are a plurality of different current vectors i1, i2 . . . i6 which can result from various combinations of conducting power transistor switches at+, bt+ . . . cb– in FIG. 2. These appear as vertical arrows extending from a negative voltage to a positive voltage. Associated with each vertical arrow is a horizontal arrow bearing the same designation in parenthesis, which indicates the portion of each cycle within which the corresponding current vector may be switched (about fifty-five times per cycle in the example hereinafter) to produce positive voltage at the output terminals (Vj>Vk) whenever the input command is positive (m*>0). In each instance, the top portion of the arrow is designated as current flowing through a switch designated a, b or c, the designation At indicating that either the transistor at+ or the transistor at– will be conducting at that particular time, depending upon whether current flow is to be positive or negative, as described hereinbefore. Similarly, the designation Cb for the current vector i1 indicates that one of the transistors cb+, cb–, will be conducting in dependence upon whether the current flow is to be positive or negative, respectively. Thus, for the current vector i1 (whether it be positive or negative, as described hereinafter) is achieved by connecting phase c of the AC mains and phase a of the AC mains to the terminals k and j of the matrix, respectively. The current vector i1 can exist in time from the point where Vc=0 to the point where Va=0.

The commanded modulation index, m* for the DC matrix converter is transformed to the stationary reference frame, in dq coordinates, as follows:

md=m* sin Θ mq=m* cos Θ 0<Θ<2π where Θ=0 corresponds to the q-axis of the AC mains voltage in the synchronous reference frame (63–68, FIG. 1).

The currents i1–i6 are the only possibilities that produce non-zero voltage at the output terminals (Vj not equal to Vk), which can be achieved by selective operation of two of the switches in FIG. 2 at one time. For instance, if switch at+ is operated simultaneously with switch bb+ in FIG. 2, this will result in current i6 as illustrated in FIG. 3. If at+ is operated simultaneously with cb+, this will result in current i1 of FIG. 3. If at+ is operated simultaneously with ab+, this short circuits the terminals j, k with no differential voltage produced at the output terminals (Vj=Vk), with current circulating through the at+ and ab+ switches, which is defined herein as a zero vector. The synthesis of the DC voltage is accomplished by pulse width modulation at a frequency which is very high with respect to the frequency of the AC mains, such as 10 KHz, resulting in a short modulation period, such as 100 µs. Within each 100 µs modulation period, a first pair of switches (such as At, Bb) will be conducting for some fraction of the modulation period (defined as "duty ratio" and as "duration"), a second pair of switches (such as At, Cb) will be conducting for some portion of that modulation period, and a zero vector formed by a set of switches related to the same phase, such as Bt, Bb will be conducting for the remaining fraction of time to provide a zero vector, as described hereinafter.

Figure 4:
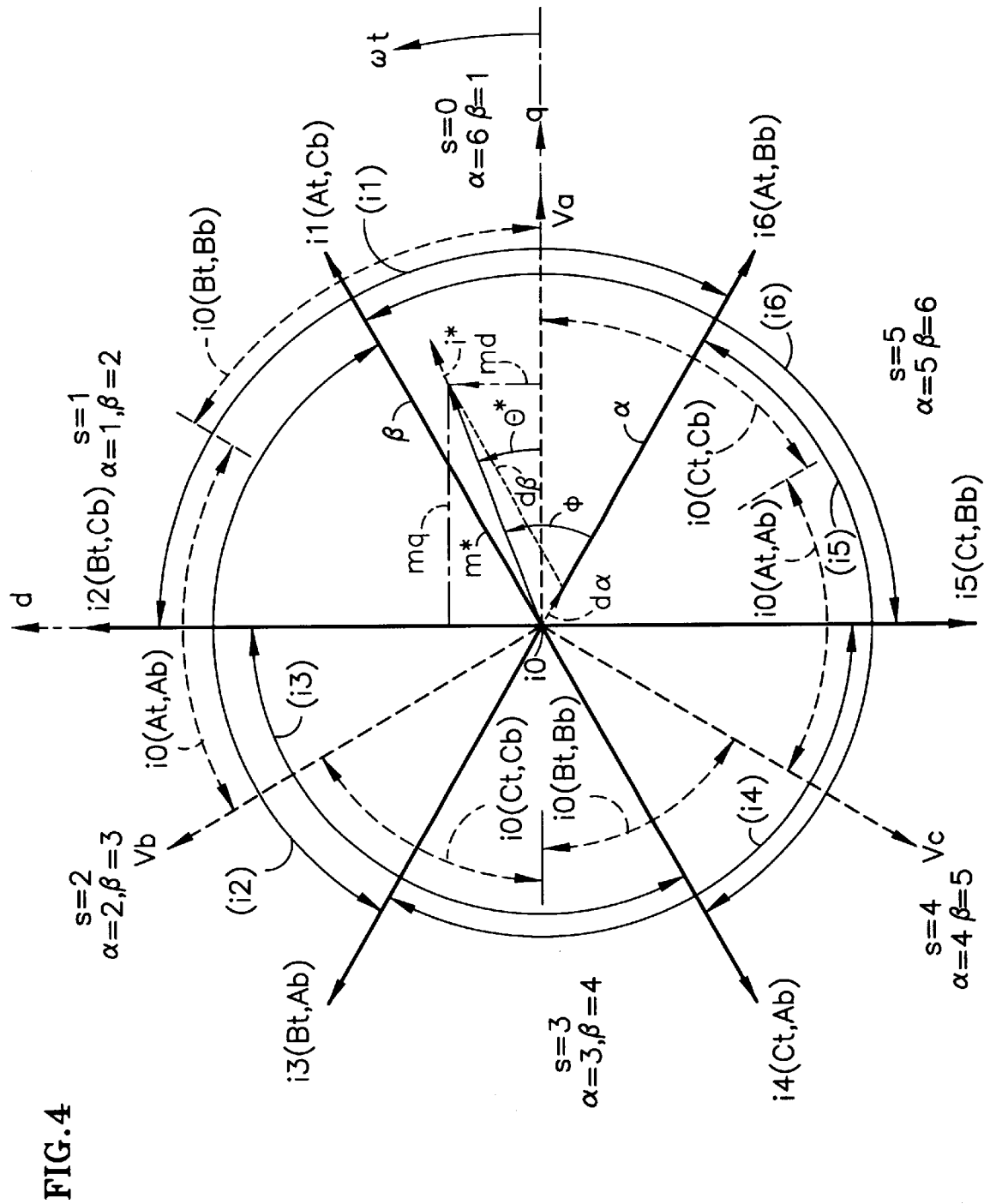
FIG. 4 is a space-vector diagram illustrating principles of the present invention.

Referring to FIG. 4, a space vector diagram, illustrating the methodology for controlling the DC matrix converter, includes each of the current vectors i1–i6 which result from turning on a selected pair of switches, as described hereinbefore. The current vectors i1–i6 are boundaries separating six phase sectors, s=0, . . . s=5. Each boundary is a lagging boundary for one phase sector and a leading boundary for the next following phase sector. In FIG. 4, a particular torque current reference, i*, for a case when positive output voltage is to be produced (m*>0), is illustrated within a modulation period which exists at a point in time when i6 may be utilized and when i1 may be utilized. This is defined as phase sector zero (s=0). The resulting modulation index m* and related quantities md, mq are also shown. For the modulation period depicted in FIG. 4, a leading current vector (or boundary) defined as Iα is the current vector i6, and a lagging current vector (or boundary) defined as Iβ is the current vector i1. The duty ratios, or durations of time, dα, dβ, that pairs of switches are turned on, for corresponding current vectors Iα, Iβ, in order to approximate the reference vector, i*, is proportional to the sine of the angle between the reference vector and the corresponding leading and lagging current vectors Iα, Iβ. The duty ratios to be used in each sector are given by $$d\alpha = m^* \sin(\pi/3 - \phi) \quad d\beta = m^* \sin(\phi) \quad 0 < \phi < \pi/3$$

$$d0 = 1 - d\alpha - \beta,$$

where $\phi=0$ and $\phi=\pi/3$ correspond to the angular location of the α-vector and β-vector, respectively.

In further accord with the invention, to determine the switch times, the above modulation functions are expressed in terms of dq quantities by using trigonometric angle-sum relations in each sector as follows. Using the above equations and the fact that $\phi=\pi/6+\Theta-s\pi/3$, where s is the sector in FIG. 4, for 0<s<5, one can express $$d\alpha = m^*\sin\{\pi/3 - (\pi/6 + \theta - s\pi/3\} = m^*\sin(\pi/6 + s\pi/3 - \theta)$$
$$= m^*\sin(\pi/6 + s\pi/3)\cos\theta - m^*\cos(\pi 6 + s\pi/3)\sin\theta$$
$$= \sin(\pi/6 + s\pi/3)mq - \cos(\pi/6 + s\pi/3)md$$

and $$d\beta = m^*\sin\{\pi/6 + \theta - s\pi/3\} = m^*\sin(\pi/6 - s\pi/3 + \theta)$$
$$= m^*\sin(\pi/6 + s\pi/3)\cos\theta + m^*\cos(\pi 6 + s\pi/3)\sin\theta$$
$$= \sin(\pi/6 - s\pi/3)mq + \cos(\pi/6 - s\pi/3)md$$

For reference, the values of the sine and cosine coefficients in the above equations are given in the following table, for each sector s=0 through s=5.

| s | sin(π/6 + s π/3) | −cos(π/6 + s π/3) | sin(π/6 − s π/3) | −cos(π/6 − s π/3) |
|---|---|---|---|---|
| 0 | ½ | −√3/2 | ½ | √3/2 |
| 1 | 1 | 0 | −½ | √3/2 |
| 2 | ½ | √3/2 | −1 | 0 |
| 3 | −½ | √3/2 | −½ | −√3/2 |
| 4 | −1 | 0 | ½ | −√3/2 |
| 5 | −½ | −√3/2 | 1 | 0 |

If the following quantities are defined:

$$m1 = \frac{\sqrt{3}}{2}md - \frac{1}{2}mq$$

$$m2 = \frac{\sqrt{3}}{2}md + \frac{1}{2}mq$$

then the modulation functions (α and β duty ratios) are determined in each sector by the quantities given in the following table:

| s | dα | dβ |
|---|---|---|
| 0 | −m1 | m2 |
| 1 | mq | m1 |
| 2 | m2 | −mq |
| 3 | m1 | −m2 |
| 4 | −mq | −m1 |
| 5 | −m2 | mq |

This is illustrated in the space-vector diagrams of FIGS. 5 and 6. Thus, the duty cycles for both vectors dα and dβ are determined solely by the quantities mq, m1 and m2, which can be easily calculated on a digital signal processor using the foregoing equations as shown in steps 101–104 in FIG. 8.

During a modulation period which is at the beginning of a sector, the switching time for the α vector will be significant, and the switching time for the β vector will be slight. Midway through the sector, the switching time for the α vector will be equal to the switching time of the β vector. Near the end of a sector, the on-time for the β vector will be significant and the on-time for the α vector will be slight. In the remainder of each modulation period, d0=1−dα−dβ (the duration for the zero vector), a pair of switches related to the same AC main, such as Bt, Bb, will be turned on so as to provide a zero vector, thereby adjusting the magnitude of the output voltage while utilizing a minimum number of switch commutations. The times when the various top switches will be turned on so as to conduct an α vector are shown in FIG. 9, and the times to conduct a β vector are shown in FIG. 10. The times the various bottom switches are turned on so as to conduct an α vector are shown in FIG. 11, and the times when they are turned on so as to conduct a β vector are shown in FIG. 12. When to apply each quantity (mq, m1, m2) necessitates a determination of the sector in which the AC mains input voltage vector lies, which is accomplished with inequality testing, and testing whether m* is positive or negative. The inequalities that define the sector boundaries for m*>0 are shown in FIG. 7. Therein, Vd and Vq refer to the input AC mains voltage in stationary coordinates (56, FIG. 1). For negative commands (m*<0) the current vector I* is shifted by $\pi$ radians from that shown in FIG. 4. The following table shows the quantities to use in selecting the top and bottom $\alpha$ and $\beta$ switches.

|  | m* > 0 | m* < 0 |
|---|---|---|
| Top Switches | Vd' = Vd<br>Vq' = Vq | Vd' = −Vd<br>Vq' = −Vq |
| Bottom Switches | Vd' = −Vd<br>Vq' = −Vq | Vd' = Vd<br>Vq' = Vq |

Therefore, test 107 and steps 108–111 define Vd' and Vq' appropriately for the sign of m* before the inequalities are tested. From FIG. 6, $|d\beta|$=m2 in sectors 0 and 3, which are defined by the following inequality:

$$[Vd > -Vq/\sqrt{3}] \cap Vd <$$
$$Vq/\sqrt{3}] \cup [Vd < -Vq/\sqrt{3} \cap Vd > Vq/\sqrt{3}]$$
$$[|Vd| < Vq/\sqrt{3}] \cup [|Vd| < -Vq/\sqrt{3}]$$
$$|Vd\sqrt{3}| < |Vq|$$

Figure 8:
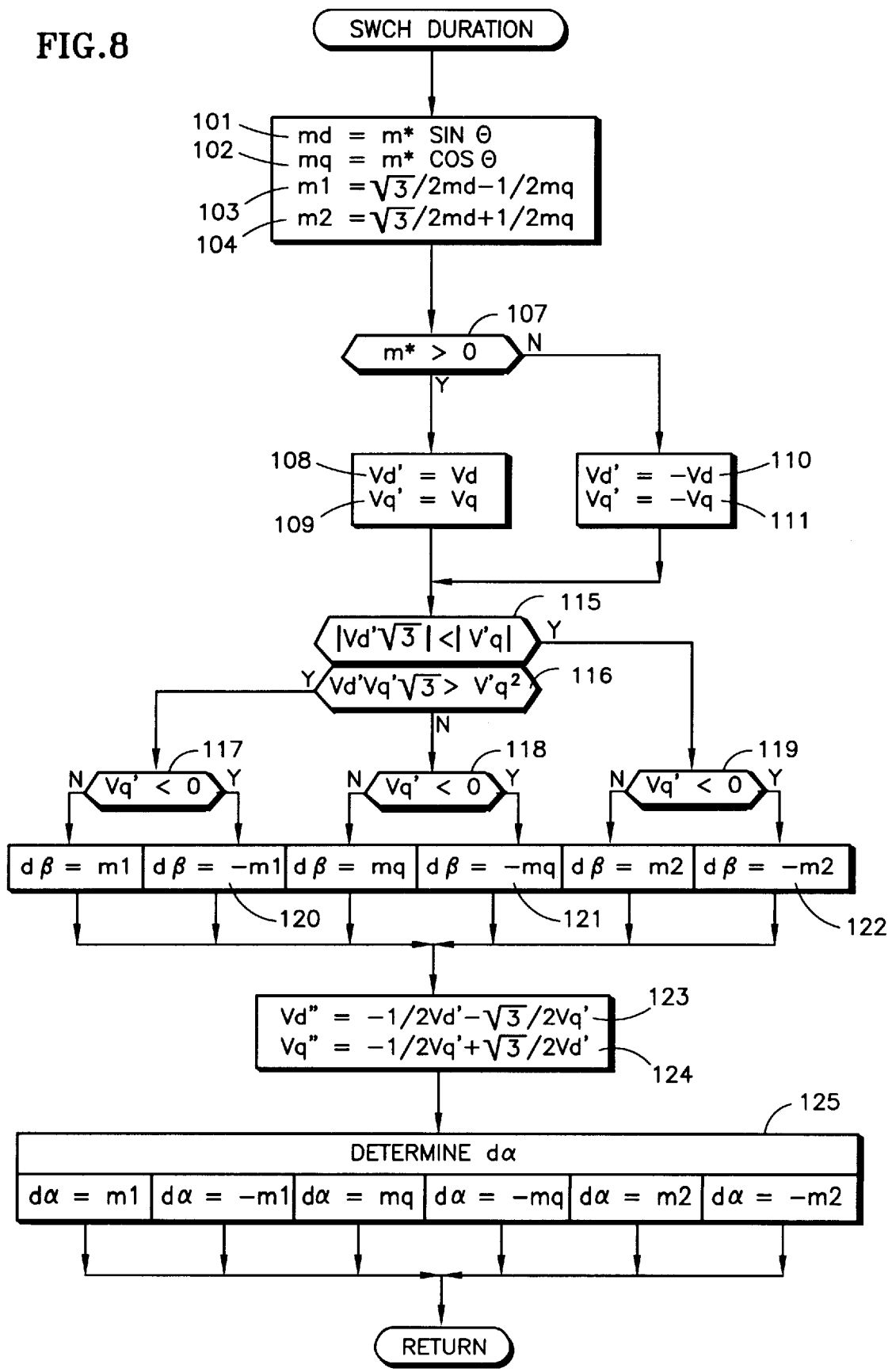
FIG. 8 is a simplified logic flow diagram of an exemplary routine for determining switch-on durations in accordance with the invention.

This is easily tested for on a digital signal processor as shown in test 115 of FIG. 8. Similarly, $|d\beta|$=m1 in sectors 1 and 4, which are defined by the following inequality:

$$[Vd < 0 \cap Vd < Vq/\sqrt{3}] \cup [Vq > 0 \cap Vd > Vq/\sqrt{3}]$$
$$[VdVq > Vq^2/\sqrt{3}] \cup [VdVq > Vq^2/\sqrt{3}]$$
$$VdVq\sqrt{3} > Vq^2$$

This is determined in test 116 of FIG. 8.

The remaining sectors, 2 and 5, in which $|d\beta|$=mq, are determined through the process of elimination (tests 115 and 116 negative, FIG. 8). The sign of d$\beta$ is determined by testing the sign of Vq in tests 117–119 of FIG. 8; i.e., d$\beta$=−d$\beta$ if Vq<0, as shown in steps 120–122, FIG. 8.

The duty ratio din is easily obtained by noting in FIG. 5 that d$\alpha$ is shifted 2$\pi$/3 radians relative to d$\beta$, in FIG. 6. Hence, the determination of d$\alpha$ is identical to the assignments above by using the following substitution when testing the above inequalities:

$$Vd'' = -\frac{1}{2} Vd' - \frac{\sqrt{3}}{2} Vq'$$
$$Vq'' = -\frac{1}{2} Vq' - \frac{\sqrt{3}}{2} Vd'$$

This is achieved by steps 123 and 124 (FIG. 8) which make the substitution, and steps and tests 125 which repeat steps and tests 115–122, etc.

Once the on-times are determined for the $\alpha$ and $\beta$ vectors, it is necessary to determine which switches are to be turned-on to produce the vectors according to FIG. 4. This is a two-step process: a determination of switches for the non-zero vectors, followed by switch assignments for the zero vector.

The phases (i.e., switches) to which the above duty ratios or durations apply are determined by the region in which the voltage vector lies. For example, the switch assignments for the top power switches in the DC matrix converter for the $\alpha$ vector and $\beta$ vector are shown in FIGS. 9 and 10. If the vector lies in one of the sectors denoted Bt, then the switch assignment is made to Bt. Referring to FIG. 10, for switch Bt, the sectors s=1 or s=2 can be jointly identified by testing the following inequality (test 130, FIG. 13):

$$[Vd' > -Vq'/\sqrt{3}] \cap [Vd' > Vq'/\sqrt{3}]$$
$$Vd'\sqrt{3} > |Vq'|$$

The remaining assignments of top switches for the $\beta$-vector are determined, after eliminating sectors 1 and 2, by testing the sign of Vq as shown in FIG. 7; if Vq'>0 (test 131 affirmative), the sector is 0 or 5 and the top $\beta$ switch is At; if Vq<0 (test 131 negative), the sector is 3 or 4, and the top $\beta$ switch is Ct.

The top switch assignments for the $\alpha$-vector are easily obtained by noting in FIG. 9 the phase shift of $\pi$/3 radians relative to the top switch assignment for the $\beta$-vector in FIG. 10. Hence, the determination of the top switch for the $\alpha$-vector is identical to the assignments above if the following substitutions are first made (steps 135, 136, FIG. 13):

$$Vd' = \frac{1}{2}Vd' - \sqrt{3}Vq'/2$$

$$Vq' = -\frac{1}{2}Vq' + \sqrt{3}Vd'/2$$

Figure 13:
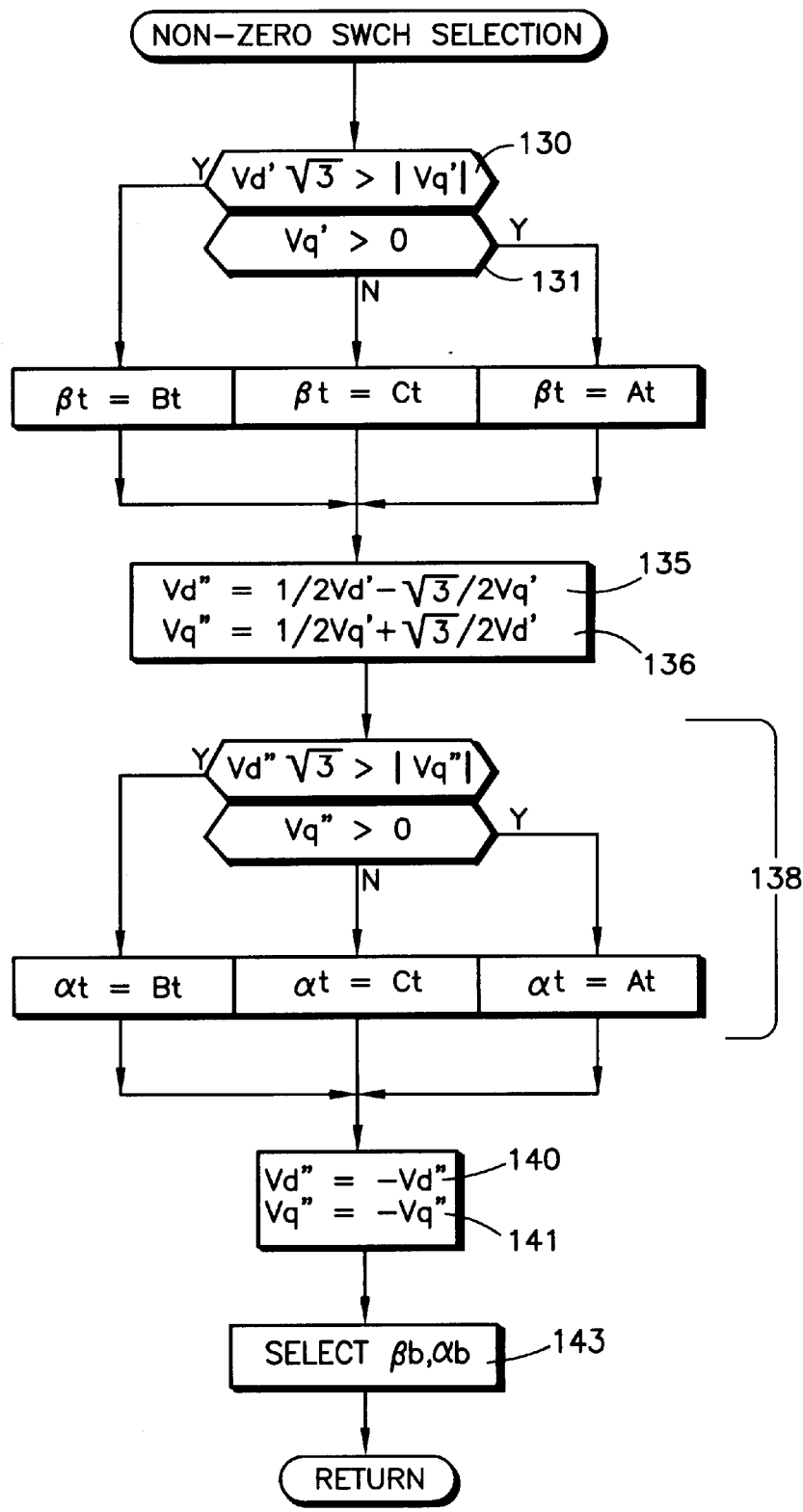
FIG. 13 is a logic flow diagram of a non-zero vector switch selection routine (simplified exemplary).

These assignments are shown in tests and steps 138 of FIG. 13.

Determination of bottom switch assignments for the $\alpha$-vector and $\beta$-vector is identical to the above except for a phase shift of $\pi$ radians between the assignments for the two groups. Hence, the determination is identical to the above when using the following substitutions (steps 140, 141, FIG. 13):

$$Vd'' = -Vd''$$

$$Vq'' = -Vq''$$

These selections are made in steps and tests 143 of FIG. 13.

As described hereinbefore, a zero vector, i0, is defined as the short circuiting of the output terminals j, k by a set of like-phase switches, At, Ab; Bt, Bb; Ct, Cb. The selection of which set of switches to use in representing the zero vector affects the common-mode output voltage. The application of each vector, i1–i6, results in each of the output terminals, j, k, to be connected to one of the AC main voltages Va, Vb, or Vc. The differential voltage applied across the load, VD, is the difference in the output phase voltages, Vj−Vk, while the common-mode voltage referenced to the system neutral, VCM, is the sum of the two output line voltages divided by the number of output phases, (Vj+Vk)/2. The resulting differential and common-mode voltages produced by each vector is given in the following tables:

| Vector | i1 | i2 | i3 | i4 | i5 | i6 |
|---|---|---|---|---|---|---|
| Switches | At,Cb | Bt,Cb | Bt,Ab | Ct,Ab | Ct,Bb | At,Bb |
| Vj | VC | VC | VA | VA | VB | VB |
| Vk | VA | VB | VB | VC | VC | VA |
| VD | VAC | VBC | VBA | VCA | VCB | VAB |
| VCM | $\frac{VA+VC}{2}$ | $\frac{VB+VC}{2}$ | $\frac{VB+VA}{2}$ | $\frac{VC+VA}{2}$ | $\frac{VC+VB}{2}$ | $\frac{VA+VB}{2}$ |

| Vector | i0 | i0 | i0 |
|---|---|---|---|
| Switches | At,AB | Bt,Bb | Ct,Cb |
| Vj | VA | VB | VC |
| Vk | VA | VB | VC |
| VD | 0 | 0 | 0 |
| VCM | VA | VB | VC |

Since the line voltages Va, Vb, and Vc are sinusoidal, the peak common-mode voltage attained by the non-zero vectors, i1 through i6, over an AC cycle is easily calculated as $$VCM(\text{peak}) = \tfrac{1}{2}\sqrt{2/3}\,VLL,\quad 0 < \omega t \leq 2\pi$$

where VLL is the rms line-to-line voltage and wt is the AC phase angle in radians. In contrast, the peak common-mode voltage attained by the zero vectors during the same period is $$VCM(\text{peak}) = \sqrt{2/3}\,VLL,\quad 0 < \omega t \leq 2\pi$$

As a consequence, an indiscriminant use of the zero vectors results in a peak common-mode voltage which is twice that for the non-zero vectors.

The zero vectors can, however, be chosen in such a way as to reduce the peak common-mode voltage. For example, if the use of the zero vector (At, Ab) is restricted to the periods $$\frac{\pi}{3} \leq \omega t \leq \frac{2\pi}{3} \quad \text{and} \quad \frac{4\pi}{3} \leq \omega t \leq \frac{5\pi}{3}$$

where $\omega t=0$ corresponds to the peak of the line voltage Va, the maximum common mode voltage is given by:

$$VCM(\text{peak}) = \sqrt{\frac{2}{3}}\,VLL\cos\left(\frac{\pi}{3}\right),\quad \frac{\pi}{3} < \omega t \leq \frac{2\pi}{3} \text{ or } \frac{4\pi}{3} < \omega t \leq \frac{5\pi}{3}$$

which equals $$VCM(\text{peak}) = \frac{1}{2}\sqrt{\frac{2}{3}}\,VLL,\quad \frac{\pi}{3} < \omega t \leq \frac{2\pi}{3} \text{ or } \frac{4\pi}{3} < \omega t \leq \frac{5\pi}{3}$$

Consequently, the peak common-mode voltage produced by this zero vector has been reduced by half, by restricting its usage during the AC cycle. To realize this reduction factor over the entire AC cycle, similar restrictions are placed on the other zero vectors. This is summarized in the following table and illustrated in FIG. 14.

| Zero Vector | Allowable Periods of Application |
|---|---|
| (At, Ab) | $\pi/3 < \omega t < 2\pi/3$ and $4\pi/3 < \omega t < 5\pi/3$ |
| (Bt, Bb) | $0 < \omega t < \pi/3$ and $\pi < \omega t < 4\pi/3$ |
| (Ct, Cb) | $2\pi/3 < \omega t < \pi$ and $5\pi/3 < \omega t < 0$ |

Figure 14:
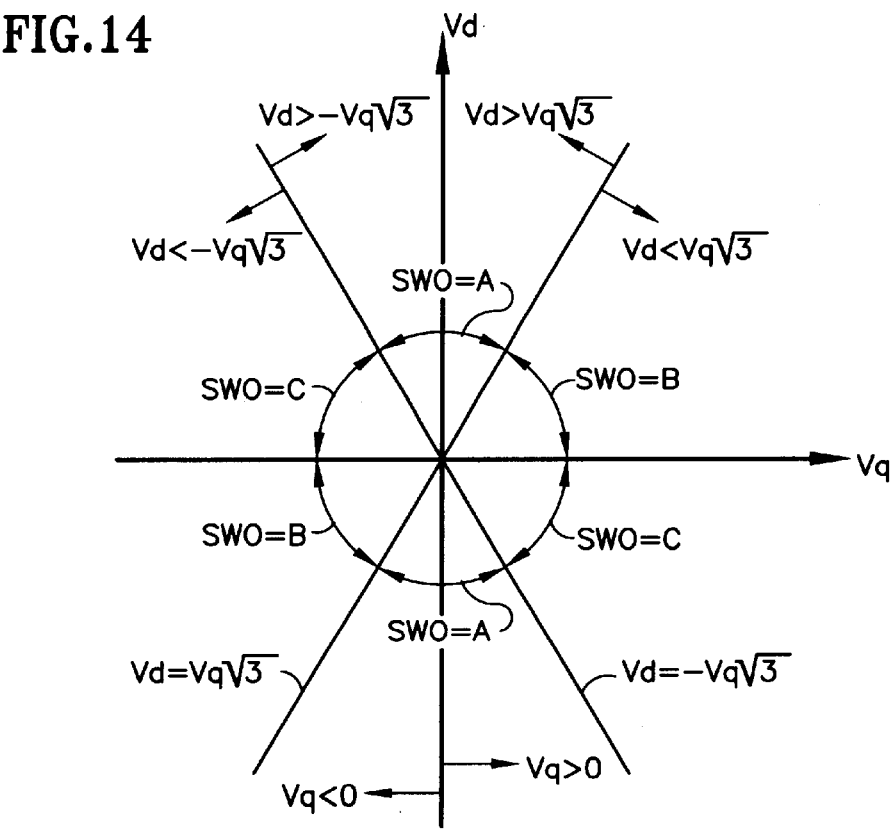
FIG. 14 is a space-vector diagram illustrating inequalities used to select zero vectors.

Determination of the switch sets for the zero vector, denoted SW0, applies to both the top and bottom groups of switches in the DC matrix converter. Determination of which sector the voltage vector lies in is accomplished with inequality testing. The inequalities that define the sector boundaries are shown in FIG. 14. The sectors, in which SW0=A, are defined by the following inequality (positive result of test 139 of FIG. 15):

$$[Vd > -Vq\sqrt{3} \cap Vd > Vq\sqrt{3}] \cup [Vd < -Vq\sqrt{3} \cap Vd < Vq\sqrt{3}]$$
$$[Vd > |Vq\sqrt{3}|] \cup [-Vd > |Vq\sqrt{3}|]$$
$$|Vd| > |Vq\sqrt{3}|$$

Figure 15:
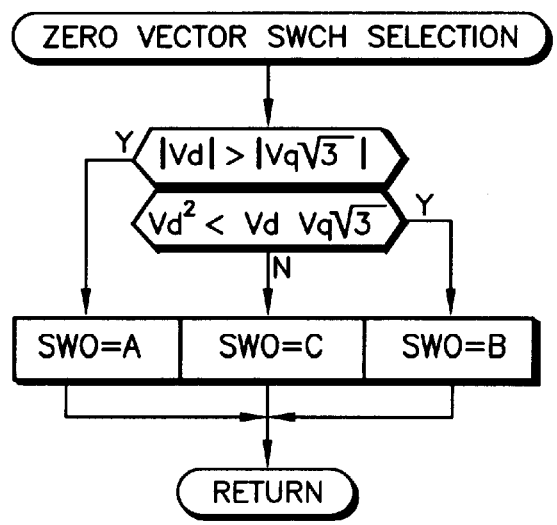
FIG. 15 is a simplified, logic flow diagram of an exemplary zero vector switch selection routine.

Similarly, SW0=B is identified by testing the following inequality (positive result of test 140 of FIG. 15);

$$[Vd > 0 \cap Vd < Vq\sqrt{3}] \cup [Vd < 0 \cap Vd > Vq\sqrt{3}]$$
$$[Vd^2 < VdVq\sqrt{3}] \cup [Vd^2 < VdVq\sqrt{3}]$$
$$Vd^2 < VdVq\sqrt{3}$$

SW0=C is determined by elimination (negative result of test 140 of FIG. 15).

If desired, programming may be simplified by noting the similarity to the algorithm for setting the duty ratios, provided the following substitution is made:

Vd=Vq

Vq=Vd

The zero vector switch selection described hereinbefore with respect to FIGS. 14 and 15 is disclosed and claimed in commonly owned copending U.S. patent application Ser. No. 09/310,311, filed contemporaneously herewith.

Within each modulation period, the order in which the various pairs and sets of switches are operated for the α vector, the β vector, and the zero vector, is immaterial. Thus the order may be α, β, zero; β, α, zero; β, zero, α; or any other order. With the constraint that a switch conducting between one of the AC mains and one of the output terminals is never shut off until another switch is turned on to conduct from an AC main to that terminal, the relationship of switch pairs (α and β) and sets (zero vectors) illustrated in FIG. 4 (along with FIGS. 9–12 and 14) show that switch commutation is minimized by practicing the present invention. For instance, switch At will be turned on as part of the α vector when the α vector is i6 (comprising the leading boundary of phase sector s=0), and remain on during the β portion of each modulation period as part of the pair for current vector i1. On the other hand, switch At may be first turned on as part of current vector i1 and remain on as part of current vector i6, within each of the modulation periods within the phase sector, s=0. And even if the zero vectors switch set is operated between the pair of α switches and the pair of β switches, in one modulation period, the At switch, for instance, may be turned on for i6 at the end of one modulation period, and remain on for i1 in the beginning of the next following modulation period. Thus, in any case, two switches will be turned on only once per modulation period, in contrast with three switches being turned on per modulation period in any schemes heretofore known to the prior art. Thus, the number of commutations for switches in forming the non-zero vectors is reduced by one-third. The same relationships exist for the zero vector commutations.

Thus, the advantages of reduced commutations offered by the space-vector approach of the invention represented in the space-vector diagram shown in FIG. 4 may be combined with the reduced requirements of common-mode magnetic components offered by reduced common-mode voltage realized by curtailing the allowable periods of application for the zero vectors, shown in said copending U.S. patent application Ser. No. 09/310,311. The combined strategy of all allowable vectors, for m*>0, is given in the following table.

| Sector | Vector Iα | Vector Iβ | Angle | Voltage Relationship | Zero Vector |
|---|---|---|---|---|---|
| 0 | i6 | i1 | 330–360 | VA > VC > VB | (C1,C2) |
|   | (A1,B2) | (A1,C2) | 0–30 | VA > VB > VC | (B1,B2) |
| 1 | i1 | i2 | 30–60 |  |  |
|   | (A1,C2) | (B1,C2) | 60–90 | VB > VA > VC | (A1,A2) |
| 2 | i2 | i3 | 90–120 |  |  |
|   | (B1,C2) | (B1,A2) | 120–150 | VB > VC > VA | (C1,C2) |
| 3 | i3 | i4 | 150–180 |  |  |
|   | (B1,A2) | (C1,A2) | 180–210 | VC > VB > VA | (B1,B2) |
| 4 | i4 | i5 | 210–240 |  |  |
|   | (C1,A2) | (C1,B2) | 240–270 | VC > VA > VB | (A1,A2) |
| 5 | i5 | i6 | 270–300 |  |  |
|   | (C1,B2) | (A1,B2) | 300–330 | VA > VC > VB | (C1,C2) |

Figure 16:
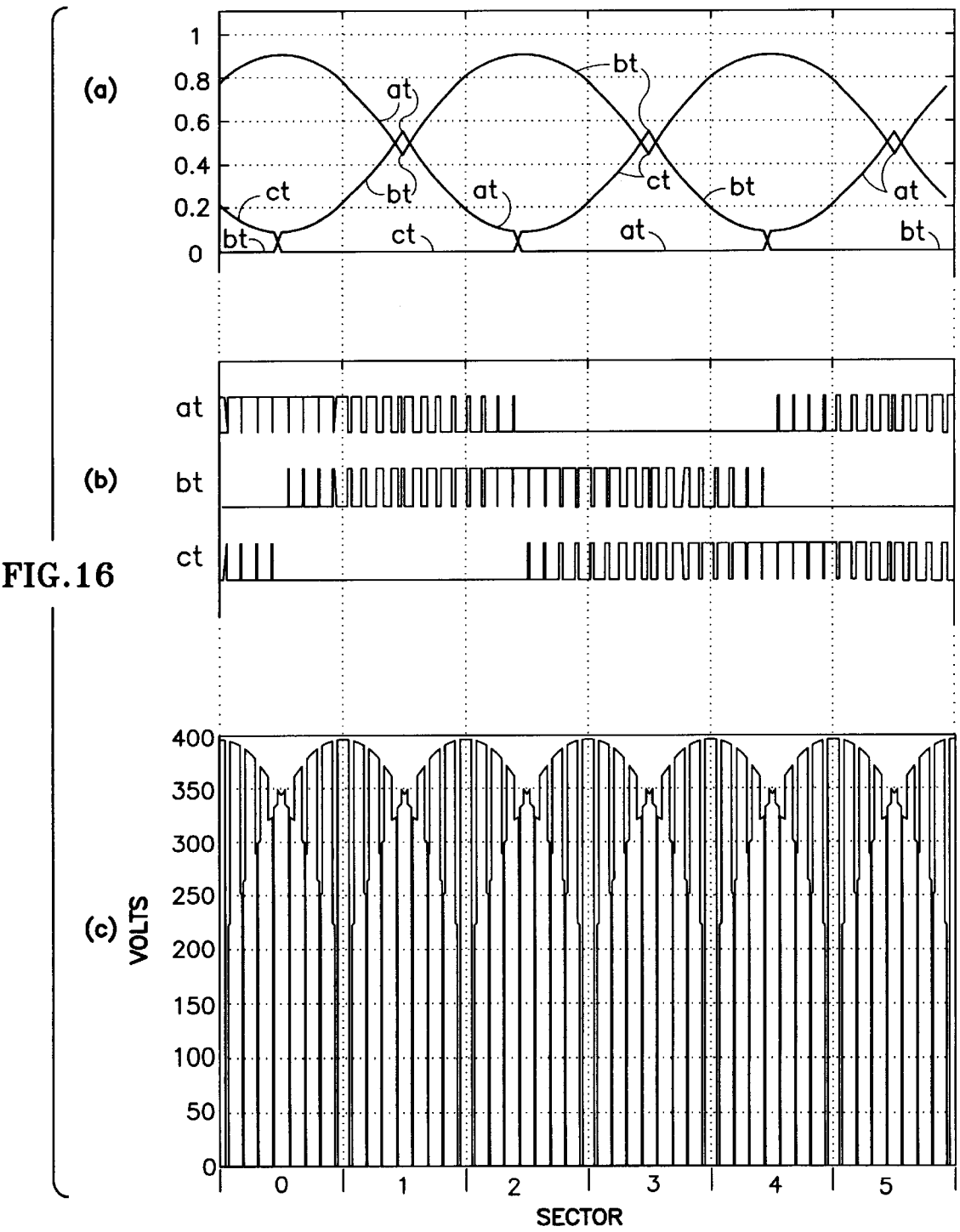
FIGS. 16a–c are a series of waveforms on a common phase base, illustrating principles of the invention.

Referring to FIG. 4, at small phase angles φ within sector 0, within each pulse width modulation period, switch At is on for a relatively long time (along with a switch Bb) in relation to the α vector I6, and it is on for a relatively short time (along with a switch Cb) in relation to the β vector, I1. At large phase angles φ within sector zero, the opposite occurs. The switch At remains continuously on for the portions related both to the α vector and the β vector. In the center of sector 0, the time that the At switch remains on is maximal, giving rise to the duty cycle waveform of FIG. 16(a). FIG. 16(b) shows an exemplary set of on times for switches at, bt and ct, and FIG. 16(c) illustrates the instantaneous (unfiltered, idealized) DC output voltage that would result.

The order in which the calculations are performed (FIGS. 8, 13 and 15) is irrelevant to the present invention. Of course, the switch selection (each pair or set) as well as the duration for each pair or set has to be known before that pair or set can be operated in each modulation period. The use of the selection and duration information within the timing circuit 78 is conventional, being essentially the same as is utilized in AC—AC matrix converters.

The invention has been described in an embodiment in which there are 12 switches at+ at–, . . . cb+, cb–, in order to accommodate loads in both directions and regeneration. However, the invention may as well be utilized in DC matrix converters driving loads in a single direction without regeneration, such as for driving power tools, or in other applications.

The present invention has been shown as it may be implemented utilizing n-type, punch-through, insulated gate bipolar transistor power switches. However, the invention may be implemented using p-type transistors, or with non-punch-through, insulated gate bipolar transistors connected in anti-parallel pairs.

The foregoing patent application and article are incorporated herein by reference.

I claim:

1. A method of controlling the flow of current through a DC matrix converter between a DC load and a set of three-phase AC mains, said DC matrix converter comprising a plurality of top switches, each connected between a corresponding one of said AC mains and a first DC output of said DC matrix converter, and a plurality of bottom switches, each connected between a corresponding one of said AC mains and a second DC output of said DC matrix converter, comprising:

operating said switches in a manner so that each switch, when operated to connect a corresponding one of said AC mains to a related specific one of said DC outputs, remains operated until another switch has operated to connect one of said AC mains to said specific DC output, and so that one of said top switches is operated contemporaneously with one of said bottom switches, said switches being operated in pairs, each pair including a top switch related to one AC main and a bottom switch related to an AC main other than said one AC main, and said switches also being operated in sets, each set including a top switch and a bottom switch both related to the same AC main;

providing a voltage command signal, V*, indicative of the voltage to be provided by said DC output terminals to said load;

providing a modulation command, m*, as the ratio of said voltage command signal, V*, to the instantaneous magnitude of voltage, V, of said AC mains in stationary d, q coordinates; and providing an in-phase modulation command component, mq=m* cos θ and a quadrature modulation command component md=m* sin θ;

providing a quantity m1=√3md/2−mq/2;

providing a quantity m2=√3md/2+mq/2;

providing an in-phase component, Vq, and a quadrature component, Vd, of the instantaneous AC mains voltage in orthogonal coordinates aligned with the phase of a given one of said AC mains; and providing, when |Vd√3|<|Vq|, a first fraction dα=−m1 if Vq>0 and dα=m1 if Vq<0, and a second fraction dβ=m2 if Vq>0 and dβ=−m2 if Vq<0;

providing when VdVq√3>Vq², said first fraction dα=−m2 if Vq>0 and dα=m2 if Vq<0, and said second fraction dβ=mq if Vq>0 and dβ=−mq if Vq<0; and providing, when neither $|Vd\sqrt{3}|<|Vq|$ nor $Vd\sqrt{3}>Vq$, said first fraction $d\alpha=mq$ if $Vq>0$ and $d\alpha=-mq$ if $Vq<0$, and said second fraction $d\beta=-m1$ if $Vq>0$ and $d\beta=-m1$ if $Vq<0$; and in each of a continuous sequence of modulation periods which are small compared with the period of voltage of said AC mains, operating a first pair of said switches for said first fraction, $d\alpha$, of said period, operating a second pair of said switches for said second fraction, $d\beta$, of said period, and operating a set of switches for the remainder of said period.

2. A method according to claim 1 wherein said first fraction of time precedes said second fraction of time within said modulation periods.

3. A method according to claim 1 wherein the remainder of said period follows said first and second fractions of time within said modulation periods.

4. A method of controlling the flow of current through a DC matrix converter between a DC load and a set of three-phase AC mains, said DC matrix converter comprising a plurality of top switches, each connected between a corresponding one of said AC mains and a first DC output of said DC matrix converter, and a plurality of bottom switches, each connected between a corresponding one of said AC mains and a second DC output of said DC matrix converter, comprising:

operating said switches in a manner so that each switch, when operated to connect a corresponding one of said AC mains to a related specific one of said DC outputs, remains operated until another switch has operated to connect one of said AC mains to said specific DC output, and so that one of said top switches is operated contemporaneously with one of said bottom switches, said switches being operated in pairs, each pair including a top switch related to one AC main and a bottom switch related to an AC main other than said one AC main, and said switches also being operated in sets, each set including a top switch and a bottom switch both related to the same AC main;

in each of a continuous sequence of modulation periods which are small compared with the period of voltage of said AC mains, operating a first pair of said switches for a first fraction, $d\alpha$, of said period, operating a second pair of said switches for a second fraction, $d\beta$, of said period, and operating a set of switches for the remainder of said period;

characterized by the improvement comprising:

providing an in-phase component, Vq, and a quadrature component, Vd, of the instantaneous AC mains voltage in orthogonal coordinates aligned with the phase of a given one of said AC mains;

if $Vd\sqrt{3}<|Vq|$, said first pair of switches include a top switch connected to a third AC main, next advanced in phase from said given one of said AC mains, but if not, then if $Vq>0$, said first pair of switches include a top switch connected to said given one of said AC mains, but if neither, then said first pair of switches include a top switch connected to a second AC main, next delayed in phase from said given one of said AC mains;

if $Vd\sqrt{3}>|Vq|$, said first pair of switches include a bottom switch connected to said third AC main, but if not, then if $-Vq<0$, said first pair of switches include a bottom switch connected to said given one of said AC mains, but if neither, then said first pair of switches include a bottom switch connected to said second AC main;

if $Vd\sqrt{3}>|Vq|$, said second pair of switches include a top switch connected to said second main, but if not, then if $Vq>0$, said second pair of switches include a top switch connected to said given one of said AC mains, but if neither, then said second pair of switches include a top switch connected to said third AC main; and if $Vd\sqrt{3}<|Vq|$, said second pair of switches include a bottom switch connected to said second main, but if not, then if $Vq<0$, said second pair of switches include a bottom switch connected to said given one of said AC mains, but if neither, then said second pair of switches include a bottom switch connected to said third AC main.

5. A method according to claim 4 wherein said first fraction of time precedes said second fraction of time within said modulation periods.

6. A method according to claim 4 wherein the remainder of said period follows said first and second fractions of time within said modulation periods.

7. A method of controlling the flow of current through a DC matrix converter between a DC load and a set of three-phase AC mains, said DC matrix converter comprising a plurality of top switches, each connected between a corresponding one of said AC mains and a first DC output of said DC matrix converter, and a plurality of bottom switches, each connected between a corresponding one of said AC mains and a second DC output of said DC matrix converter, comprising:

operating said switches in a manner so that each switch, when operated to connect a corresponding one of said AC mains to a related specific one of said DC outputs, remains operated until another switch has operated to connect one of said AC mains to said specific DC output, and so that one of said top switches is operated contemporaneously with one of said bottom switches, said switches being operated in pairs, each pair including a top switch related to one AC main and a bottom switch related to an AC main other than said one AC main, and said switches also being operated in sets, each set including a top switch and a bottom switch both related to the same AC main;

providing a voltage command signal, V*, indicative of the voltage to be provided by said DC output terminals to said load;

providing a modulation command, m*, as the ratio of said voltage command signal, V*, to the instantaneous magnitude of voltage, V, of said AC mains in stationary d, q coordinates; and providing an in-phase modulation command component, $mq=m^* \cos\theta$ and a quadrature modulation command component $md=m^* \sin\theta$;

providing a quantity $m1=\sqrt{3}md/2-mq/2$;

providing a quantity $m2=\sqrt{3}md/2+mq/2$;

providing an in-phase component, Vq, and a quadrature component, Vd, of the instantaneous AC mains voltage in orthogonal coordinates aligned with the phase of a given one of said AC mains; and providing, when $|Vd\sqrt{3}|>|Vq|$, said first fraction $d\alpha=-m1$ if $Vq>0$ and $d\alpha=m1$ if $Vq<0$, and said second fraction $d\beta=m2$ if $Vq>0$ and $d\beta=-m2$ if $Vq<0$;

providing when $Vd\sqrt{3}=Vq$, said first fraction $d\alpha=-m2$ if $Vq>0$ and $d\alpha=m2$ if $Vq<0$, and said second fraction $d\beta=mq$ if $Vq>0$ and $d\beta=-mq$ if $Vq<0$; and providing, when neither $|Vd\sqrt{3}|<|Vq|$ nor $Vd\sqrt{3}>Vq$, said first fraction $d\alpha=mq$ if $Vq>0$ and $d\alpha=-mq$ if $Vq<0$, and said second fraction $d\beta=m1$ if $Vq>$ and $d\beta-m1$ if $Vq<0$;

in each of a continuous sequence of modulation periods which are small compared with the period of voltage of said AC mains, operating a first pair of said switches for a first fraction, dα, of said period, operating a second pair of said switches for a second fraction, dβ, of said period, and operating a set of switches for the remainder of said period;

and further comprising:

if Vd√3<|Vq|, said first pair of switches include a top switch connected to a third AC main, next advanced in phase from said given one of said AC mains, but if not, then if Vq>0, said first pair of switches include a top switch connected to said given one of said AC mains, but if neither, then said first pair of switches include a top switch connected to a second AC main, next delayed in phase from said given one of said AC mains;

if Vd√3>|Vq|, said first pair of switches include a bottom switch connected to said third AC main, but if not, then if Vq<0, said first pair of switches include a bottom switch connected to said given one of said AC mains, but if neither, then said first pair of switches include a bottom switch connected to said second AC main;

if Vd√3>|Vq|, said second pair of switches include a top switch connected to said second main, but if not, then if Vq>0, said second pair of switches include a top switch connected to said given one of said AC mains, but if neither, then said second pair of switches include a top switch connected to said third AC main; and if Vd√3<|Vq|, said second pair of switches include a bottom switch connected to said second main, but if not, then if Vq<0, said second pair of switches include a bottom switch connected to said given one of said AC mains, but if neither, then said second pair of switches include a bottom switch connected to said third AC main.

8. A method according to claim 7 wherein said first fraction of time precedes said second fraction of time within said modulation periods.

9. A method according to claim 7 wherein the remainder of said period follows said first and second fractions of time within said modulation periods.

* * * * *